US009201985B2

(12) United States Patent
Elias et al.

(10) Patent No.: US 9,201,985 B2
(45) Date of Patent: Dec. 1, 2015

(54) DISPLAYING ANNOTATION IN MULTIPLE VISUALIZATIONS

(75) Inventors: Micheline Elias, Paris (FR); Anastasia Bezerianos, Paris (FR)

(73) Assignee: SAP SE, Walldorf (DE)

( * ) Notice: Subject to any disclaimer, the term of this patent is extended or adjusted under 35 U.S.C. 154(b) by 845 days.

(21) Appl. No.: 13/297,305

(22) Filed: Nov. 16, 2011

(65) Prior Publication Data

US 2013/0124965 A1 May 16, 2013

(51) Int. Cl.
*G06F 17/00* (2006.01)
*G06F 17/30* (2006.01)

(52) U.S. Cl.
CPC .... *G06F 17/30994* (2013.01); *G06F 17/30958* (2013.01)

(58) Field of Classification Search
CPC ............ G06F 17/241; G06F 17/30867; G06F 17/30283; G06F 17/30861; G06F 17/3082; G06F 17/30958; G06Q 30/02; G06Q 10/101; G06Q 40/06
See application file for complete search history.

(56) References Cited

U.S. PATENT DOCUMENTS

| | | | | |
|---|---|---|---|---|
| 8,667,385 | B1 * | 3/2014 | Mui et al. ....................... | 715/230 |
| 2007/0245238 | A1 * | 10/2007 | Fugitt et al. ..................... | 715/700 |
| 2011/0106589 | A1 * | 5/2011 | Blomberg et al. ........... | 705/7.39 |
| 2011/0219325 | A1 * | 9/2011 | Himes et al. ................... | 715/771 |
| 2011/0258104 | A1 * | 10/2011 | Highland et al. ............... | 705/37 |
| 2012/0179513 | A1 * | 7/2012 | Siklos et al. ................. | 705/7.39 |

OTHER PUBLICATIONS

Yang Chen et al.; Toward effective insight management in visual analytics systems; Proceedings of PACIFICVIS '09 Proceedings of the 2009 IEEE Pacific Visualization Symposium; 8 pages (http://www.viscenter.uncc.edu/TechnicalReports/CVC-UNCC-08-37.pdf).

Yang Chen et al.; Click2Annotate: Automated Insight Externalization with Rich Semantics; Proceedings of 2010 IEEE Symposium on Visual Analytics Science and Technology (VAST); 8 pages (http://ieeexplore.ieee.org/xpl/freeabs_all.jsp?arnumber=5652885).

Yedendra B. Shrinivasan et al.; Connecting the Dots in Visual Analysis; Proceedings of 2009 IEEE Symposium on Visual Analytics Science and Technology,VAST 2009; 8 pages (http://ieeexplore.ieee.org/xpl/freeabs_all.jsp?arnumber=5333023).

(Continued)

*Primary Examiner* — Kavita Padmanabhan
*Assistant Examiner* — Ariel Mercado

(57) ABSTRACT

Various embodiments of systems and methods for context aware annotations are described herein. A user request is received to visualize a dataset according to a user selected visualization type. A visualization of the dataset is created according to the user selected visualization type and the created visualization is displayed on the computer screen. The context information of each region of the displayed visualization is compared with the context information stored in annotations stored in the memory. Based on the comparison, a determination is made whether the context information stored in any of the annotations matches with the context information of any of the regions. The annotation is displayed on the region of the visualization, which has the same context information. In one embodiment, a list of annotations is displayed to the user. The information related to a selected annotation from the list of annotations is displayed to the user.

18 Claims, 9 Drawing Sheets

(56) References Cited

OTHER PUBLICATIONS

Thomas Kapler et al.; GeoTime Information Visualization; Proceedings of IEEE Symposium on Information Visualization, 2004. INFOVIS 2004; 8 pages (http://ieeexplore.ieee.org/xpl/freeabs_all.jsp?arnumber=1382887).

Jeffrey Heer et al.; Voyagers and voyeurs: Supporting asynchronous collaborative visualization; published in the Communications of the ACM; vol. 52 Issue 1, Jan. 2009; 11 pages (http://dl.acm.org/citation.cfm?id=1435439).

Anonymous; Tableau Technology; Published by Tableau Software 2003-2014; 6 pages (http://www.tableausoftware.com/products/technology).

Amy Groden-Morrison et al;TIBCO Spotfire 4.0 Combines 'Free Dimensional' Analytics With the Power of Collective Intelligence; Published by TIBCO Software Inc. 2000-2011; 4 pages (https://web.archive.org/web/20120117075613/http://spotfire.tibco.com/Home/about-spotfire/news-room/press-releases/2011/11_14_11-Spotfire4-0.aspx).

* cited by examiner

DISPLAYING ANNOTATION IN MULTIPLE VISUALIZATIONS

FIELD

Embodiments generally relate to computer systems, and more particularly to methods and systems for annotating visualizations.

BACKGROUND

Currently several annotation tools, such as GeoTime 5™, Voyagers and Voyeurs™, etc. are available that allows a user to annotate a visualization, such as a graph or a chart. However, some of these tools allow annotation creation with respect to only one type of visualization. For example, the GeoTime 5™ visualization tool allows the user to create annotation only with respect to a map. Further, some other annotation tools, such as the Voyagers and Voyeurs™, save the annotation created for the visualization as a picture. In this case, if a user changes the visualization, for example from a bar chart to a pie chart, the annotation and the original visualization on which the annotation was created cannot be retrieved.

SUMMARY

Various embodiments of systems and methods for context aware annotation are described herein.

In one aspect, a user request is received to visualize a dataset according to a user selected visualization.

In another aspect, based on the received user request, a visualization of the dataset is created according to the user selected visualization type.

In yet another aspect, the created visualization is displayed on a user interface, the created visualization includes one or more regions.

In yet another aspect, the context information of the one or more regions is compared with the context information stored in the annotation.

In yet another aspect, based on the comparison, the annotation is displayed on the visualization.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for coordinating execution of a collaborative business process are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
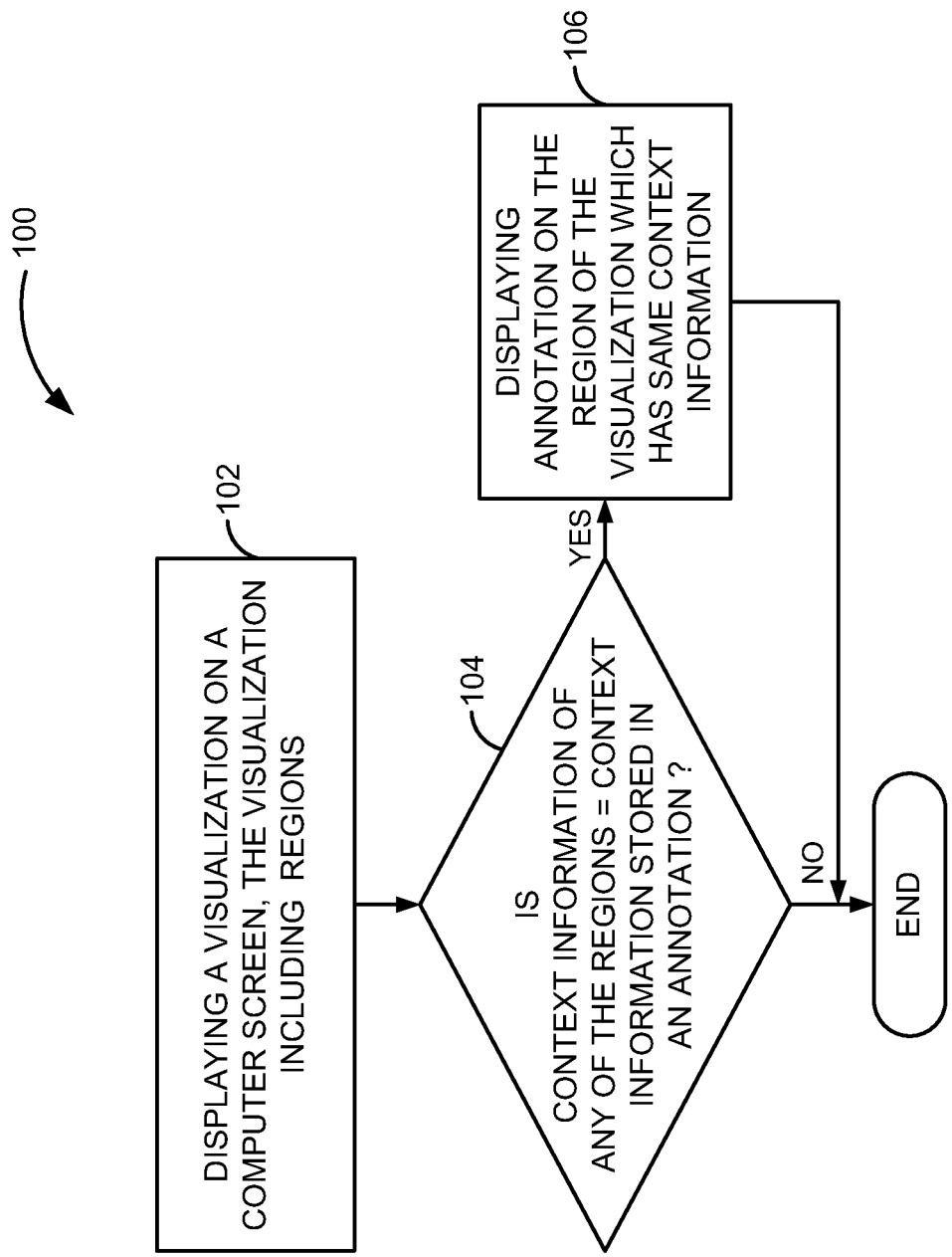
FIG. 1 is a flow diagram illustrating a method for displaying an annotation in different visualization types, according to an embodiment.

FIG. 1 is a flow diagram 100 illustrating a method for displaying an annotation in different visualization types, according to an embodiment. Initially at block 102, a visualization is displayed on a computer screen. The visualization is a visual representation of a dataset, which is a collection of data. For example, a table storing sales data of three products A, B, and C is a sales dataset. A sales bar graph, which represents the sales data of the products A, B, and C as a bar graph is a visualization of the sales dataset. The dataset can be visualized according to different visualization types, such as charts (line chart, bar chart, etc.) or a table. In the above example, "bar graph" is the visualization type of the sales bar graph. Similarly, the sales dataset can be visualized as a line graph (visualization type). In this case the visualized sales line graph (visualization) represents sales of the three products A, B, and C.

The created visualization may include plurality of regions. Each region of the created visualization is defined by its context information. In the above example, the sales bar chart (visualization) includes three regions: a region 1 for sales data of product A, a region 2 for sales data of product B, and a region 3 for sales data of product C. The context information of region 1 may include that: the region 1 represents a product, the product represented by region 1 is product A, the region 1 also represents a sales value, the sales value represented by region 1 is the sales value of product A.

Next at block 104, the context information of the plurality of regions of the visualization displayed at block 102 is compared with the context information stored in a plurality of annotations. Based on the comparison, a determination is made whether the context information stored in any of the regions of the visualization matches with the context information of any of the plurality of annotations. The plurality of annotations may be stored in a memory of a computer. An annotation can be a note, a text, or a comment stored by a user with respect to a data point in the visualization. An annotation stores the context information of the data point for which the annotation is created.

In the above example, consider that prior to displaying the sales bar chart, a sales pie chart, which is a visualization of the sales dataset is displayed to the user. The user annotates a data point, in the sales pie chart, which represents the sales value of product A, as "best sales". The annotation "best sales" stores the context information of the data point in the sales pie chart (the context information may include information that: the data point represents a product, the product represented by the data point is product A, the data point also represents a sales value, the sales value represented by the data point is the sales value of product A). In this case, the context information stored in the annotation "best sales" matches with the context information of the region 1 of the displayed sales bar chart.

Finally, if the condition in block 104 is true, the annotation is displayed on the region of the displayed visualization, which has the same context information (block 106). In the above example, the annotation "best sales" is displayed on the region 1 of the sales bar chart, which has the same context information as that stored in the annotation "best sales".

Figure 2:
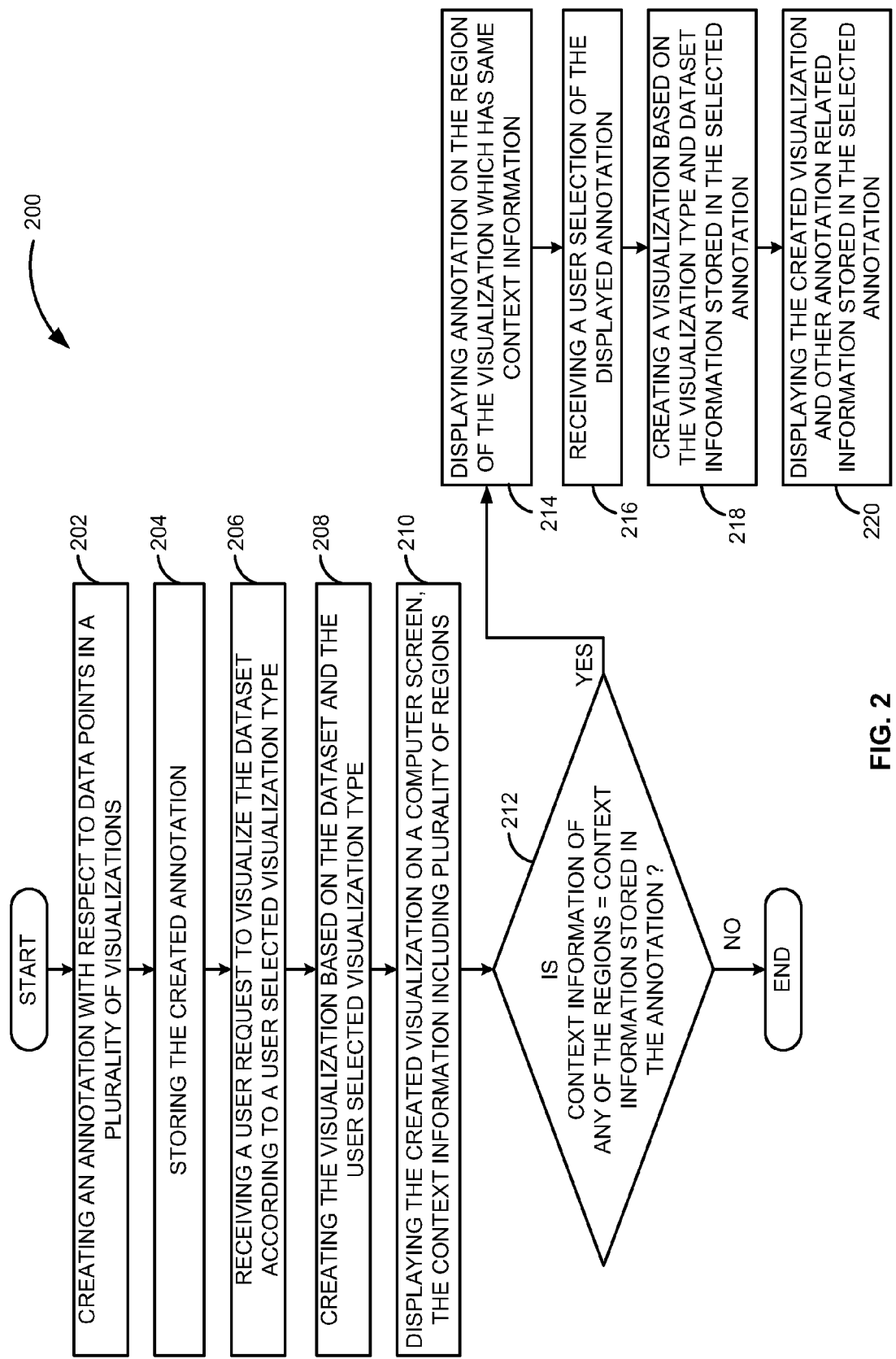
FIG. 2 is a flow diagram illustrating a method for displaying an annotation in different visualization types, according to an embodiment.

FIG. 2 is a flow diagram 200 illustrating a method for displaying an annotation in different visualization types, according to an embodiment. Initially at block 202, an annotation is created with respect to data points. A data point is a point within a visualization that the user wants to annotate. The annotation may be created with respect to data points in two or more visualizations. The visualizations are visual representations of a plurality of datasets. A user may view the visualizations on a computer screen and select a data point within each of the visualizations for which the annotation is to be created. For example, consider that a user is viewing two visualizations on a computer screen: a population pie chart which is a visual representation of a population dataset that stores population of a country X for years 2008-2010, and a profit bar chart which is a visual representation of a profit dataset that stores the profit of company XYZ for years 2008-2010. The user selects a data point 1 in the population pie chart and a data point 2 in the profit bar chart for which the annotation is to be created.

After selecting the data points, the user may click on an "annotate" button on the computer screen for creating the annotation for the selected data points. In one embodiment, an annotation information inputting screen may next be displayed to the user for providing details for creating the annotation. The user may provide a name of the annotation in the annotation information inputting screen. The user may also add a text, an image, a link, or a document for the annotation. In the above example, the user may provide a name "maximum" for the annotation being created with respect to the data point 1 and the data point 2. During the creation of the annotation, the name of the annotation is stored in the annotation.

In one embodiment, during creation of the annotation, the context information of the data points for which the annotation is being created is also stored in the annotation. The context information may include a dimension and measure of the data points for which the annotation is being created. The dimension is a line in a real or abstract space. An example of a real space dimension is a pair of anti parallel cardinal points on a compass, e.g., North and South, North-northwest and South-southeast. The measure is a quantity as ascertained by comparison with a standard, usually denoted in some unit, e.g., units sold, dollars. The dimension may include the dimension ID which is the name of the dimension for the selected data points, and the dimension value which is the value of the dimension for the selected data points. The measure includes the measure ID which is the name of the measure for the selected data points, and the measure value which is the value of the measure for the selected data points. In the above example, consider that the data point 1 (in the population pie chart), represents the population (1 million) of country X for year 2008 and the data point 2 (in the profit bar chart), represents the sales (25,000 $) of company XYZ for year 2009. In this case, the context information of the data point 1 includes:

dimension ID: year,
dimension value: 2008,
measure ID: population and
measure value: 1 million
Similarly, the context information of the data point 2 includes:
dimension ID: year,
dimension value: 2009,
measure ID: sales, and
measure value: 25,000$.

The context information of the data points referenced by the annotation is stored in the annotation. In the above example, the "maximum" annotation stores the context information of the data point 1 and the data point 2 for which the annotation "maximum" is being created.

The annotation also stores the datasets corresponding to the visualizations (which include the selected data points). In the above example, the "maximum" annotation stores the "population" dataset and the "profit" dataset corresponding to the population pie chart (that includes the data point 1) and the profit bar chart (that includes the data point 2), respectively. During the creation of the annotation, the visualization types of the visualizations that include the selected data points are also stored in the annotation. A visualization type defines the type of the visualization. For example, a sales pie chart, a population pie chart, a revenue pie chart has a visualization type as "pie chart" which is the visualization type of these three charts. In the above example, the "maximum" annotation stores the visualization types: "pie chart" and "bar chart", corresponding to the population pie chart and the profit bar chart, respectively.

In one embodiment, the visualizations are viewed by a user on business intelligence (BI) dashboard. A business intelligence (BI) document may contain the visualization viewed on the BI dashboard. For example, a first business intelligence document may contain a pie chart visualizing a first dataset and a second business intelligence document may contain a table visualizing a second dataset. In the above example, a "population" business intelligence document may include the population pie chart and a "profit" business intelligence document may include the "profit" bar chart.

In one embodiment, the annotations are created using a Dimensional Semantic Layer (DSL) of Business Objects. The dimension ID and the measure ID of the data points are unified in the DSL, which permits to provide transparent annotations through different datasets. For example, consider a dataset 1 that stores time values (dimension value) with a dimension ID "time" and a dataset 2 that stores time values (dimension values) with a dimension ID "time calculated." In this case, an annotation 1 and an annotation 2 created for visualization of dataset 1 and the dataset 2, respectively, store different dimension IDs, "time" and "time calculated", respectively, for the same dimension "time". The DSL avoids this discrepancy by unifying the dimension IDs and measure IDs for different datasets. In the above example, the DSL unifies the dimension IDs "time" and "time calculated" by providing a dimension ID "time 0" that represents the dimension ID "time" and "time calculated" in the dataset 1 and the dataset 2, respectively. In this case, the annotation 1 and the annotation 2 store the dimension ID "time" dimension of the dataset 1 and the dataset 2 with the same dimension ID "time 0" provided by the DSL.

In one embodiment, the annotation information inputting screen provides a set of categories as options and the user can select one of the categories for the annotation. For example, the system may provide a list of categories as: public, private, etc., when a user is creating an annotation. A user may select one of the categories from the list of categories for the annotation. During the creation of the annotation, the selected category is also stored in the annotation.

In one embodiment, recommendations are provided to the user for creating the annotation. The recommendations may include a list of other annotations, stored in the memory, which have similar context information as that of the data points selected for the annotation. A similarity average measure may also be provided beside each recommended annotations to aid the user in considering the importance of the recommended annotation. The similarity average measure may be the average of the similarity between the measure ID, the measure value, the dimension ID, and the dimension value of the recommended annotation and the data points selected for annotation. For example, consider that a user annotates the sales revenue 1000$ of product X as "best sales". In this case, the context information stored in the annotation "best sales" include the dimension ID "product", the dimension value "product X", the measure ID "sales revenue", and the measure value "1000$". Next, consider that a user 1 wants to create an annotation for a data point, in a sales pie chart, which represents the sales revenue 1000$ of a product Y. In this case, the dimension ID (product), the measure ID (sales revenue) and the measure value (1000$) matches with the dimension ID, the measure ID and the measure value of the data point in the sales pie chart. Therefore, the annotation "best sales" is provided as a recommendation to the user with a similarity average measure as 75%.

The user can also define a lifetime of the annotation in the annotation information inputting screen. The user defined lifetime is stored in the annotation. The lifetime defines the time duration for which the annotation is valid and stored in the memory. For example, if the user wants to create an annotation to indicate an event that lasts for two weeks, then the user may define the lifetime of the annotation as two weeks. In this case, the annotation is visible for two weeks (life time) and is deleted from the memory or is archived after two weeks. The lifetime of the annotation can also be defined based on a predetermined rule. For example, a predetermined rule may be that if the sales of a product Z exceeds 10000$ then an annotation "low sales" is to be deleted from the memory. In this case, the annotation "low sales" is automatically deleted from the memory or is archived when the sales of the product exceeds 1000$. In one embodiment, a user may request to receive a notification before the annotation is deleted.

In one embodiment, if the data points being annotated are in a region of a visualization having hierarchical dimension, then the annotation information inputting screen allows the user to choose the hierarchies on which the annotation is to be visible. The visibility information selected by the user is stored in the annotation. For example, consider that a user creates an annotation for a dimension "time" on the level "quarter" (value=3) which has an upper level "year" (value=2009). The user chooses to make the annotation visible through different hierarchies. In this case, an icon representing the annotation (created for the level "quarter") appears on the year 2009 if the time dimension is visualized with the "year" granularity.

Further, the annotation information inputting screen also allows the user to provide ratings and comments for the annotation. For example, a user may provide a rating 5 to denote that the annotation is of high importance. The ratings and comments for the annotation are stored in the annotation. Creation attributes such as date of creation, creator name, etc. are also stored in the annotation. In one embodiment, the system also stores an image of the visualization for which the annotation is being created. In the above example, the system may store the image of the population pie chart and the sales bar chart for which the annotation "maximum" is being created. Next at block 204, the created annotation is stored in the memory of the computer. In the above example, the created annotation "maximum" is stored in the memory.

Next at block 206, a user request is received to visualize a data set according to a user selected visualization type. In one embodiment, a user selects a data set that the user wants to visualize and a visualization type for visualizing the dataset. A plurality of visualization types are provided as options to the user. The user can select one of the visualization types, for viewing the selected data set, from the plurality of visualization types. For example, the user may select the "population" data set, which as discussed above, stores the population of the country X for year 2008-2010, and a "line chart" as the visualization type for visualizing the "population" data set.

Next, a visualization of the dataset is created based on the data set and the visualization type selected by the user (block 208). In the above example, the "population" line chart (visualization) is created based on the "population" dataset and the "line chart" (visualization type) selected by the user. The created visualization is then displayed on the computer screen (block 210). In the above example, the system displays the "population" line chart to the user. The "population" line chart includes three regions: a region 1 corresponding to the population value (1 million) in the year 2008, a region 2 corresponding to the population value (0.25 million) in the year 2009, and a region 3 corresponding to the population value (0.5 million) in the year 2010.

Next, the context information of each of the regions of the displayed visualization is compared with the context information stored in the annotation, stored in the memory (block 212). The context information of each of the regions includes the dimension ID, the dimension value, the measure ID, and the measure value of the region. In the above example, the context information for region 1 of the displayed "population" line chart may include:
dimension ID: year,
dimension value: 2008,
measure ID: population, and
measure value: 1 million.

As discussed above, the context information stored in the annotation includes the dimension ID, the dimension value, the measure ID, and the measure value of the data points for which the annotation is created. Therefore, the dimension ID, the dimension value, the measure ID, and the measure value stored in each of the annotations and each of the regions of the displayed visualization are compared with each other. In one embodiment, the comparison is done to determine if a portion of the context information stored in an annotation matches with the context information of any of the region in the displayed visualization. As discussed above, the annotation stores the context information of the data points for which the annotation is created. In this case, the comparison is done to determine if the context information of any one of the data points stored in the annotation matches with the context information of any one of the regions of the displayed visualization.

Based on the comparison, a determination is made whether the context information of any region of the displayed visualization matches with the context information stored in any of the annotations. In case the condition in block 212 is true, the annotation is displayed on that region of the displayed visualization, which has the same context information as the context information stored in the annotation (block 214). In one embodiment, an icon representing the annotation is displayed on the region whose context information matches with the context information stored in the annotation. In the above example, the context information stored in the "maximum" annotation matches with the context information of the region 1 of the "population" line chart. Therefore, the "maximum" annotation is displayed on the region 1 of the "population" line chart.

Next a user selection may be received for the annotation displayed in block 214 (block 216). A user may click on the displayed annotation to receive information related to the displayed annotation. Based on the received user selection, visualizations are created based on the visualization types and the data sets stored in the selected annotation (block 218). As discussed above, the annotation stores the visualization types of the visualization on which the annotation was created and the datasets corresponding to the visualizations. In one embodiment, the created visualization is compared with the image of the visualizations stored in the system to determine any difference between the created visualization and the image stored in the memory. In the above example, the system creates the "population" pie chart and the "profit" bar chart based on the visualization types, pie chart and bar chart, respectively, and the datasets (the population dataset and the profit dataset) stored in the "maximum" annotation.

Finally, the created visualizations are displayed on the computer screen (block 220). As the selected annotation also stores the context information of the data points, an icon representing the annotation is displayed on data points of the displayed visualizations. Other information stored in the annotation such as the dataset name and the creation attributes are also displayed on the computer screen. In the above example, the created "population" pie chart and the "profit" bar chart are displayed on the screen of the computer along with the "maximum" annotation on the data point 1 and the data point 2 in the "population" pie chart and the "profit" bar chart, respectively.

Figure 3:
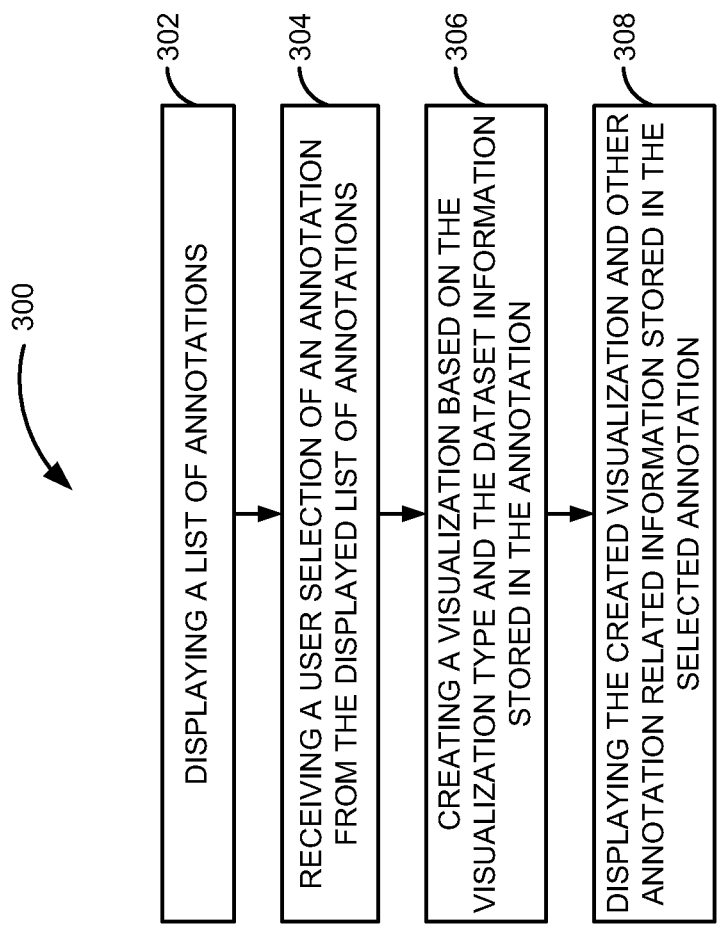
FIG. 3 is a flow diagram illustrating a method for displaying information related to a selected annotation, according to an embodiment.

FIG. 3 is a flow diagram 300 illustrating a method for displaying information related to a selected annotation, according to an embodiment. Initially at block 302, a list of annotations stored in the memory of the computer is displayed to a user. The list of annotations may include annotations created in different applications. The list may display a portion of the information stored in the annotations. For example, the list may display a portion of the name of the annotations, and other creation related attributes (a creation date, a creator name, etc.). A user may select an annotation from the list of annotations displayed to the user (block 304). The user may select the annotation by clicking on the annotation from the list of annotations. The user may select the annotation to retrieve information related to the annotation. Next, the visualizations are created based on the visualization type and the datasets stored in the selected annotation (block 306). In one embodiment, the created visualization is compared with the image of the visualizations stored in the system to determine any difference between the created visualization and the image stored in the memory.

The created visualizations are then displayed on the computer screen (block 308). As the selected annotation also stores the context information of the data points, an icon representing the annotation is displayed on data points of the displayed visualizations. Other information stored in the annotation such as the dataset name and the creation attributes are also displayed on the computer screen. In one embodiment, the similarity average measure of other annotations in the list with respect to the selected annotation is also displayed on the computer screen along with their similarity average measure.

In the above example, consider that the list of annotations displayed to the user includes the following annotations: "maximum", "minimum", "highest population", and "worst quarter". Assume that the user selects the "maximum" annotation from the list of annotations. In this case, the system creates the "population" pie chart and the "profit" bar chart based on the visualization types, pie chart and bar chart, respectively and the "population" dataset and the "profit" dataset stored in the "maximum" annotation. The created "population" pie chart and the "profit" bar chart can then be displayed as thumbnails on the computer screen. Based on the context information stored in the "maximum" annotation, the annotation "maximum" is displayed on the data point 1 and the data point 2 of the "population" pie chart and the "profit" bar chart, respectively.

Figure 4:
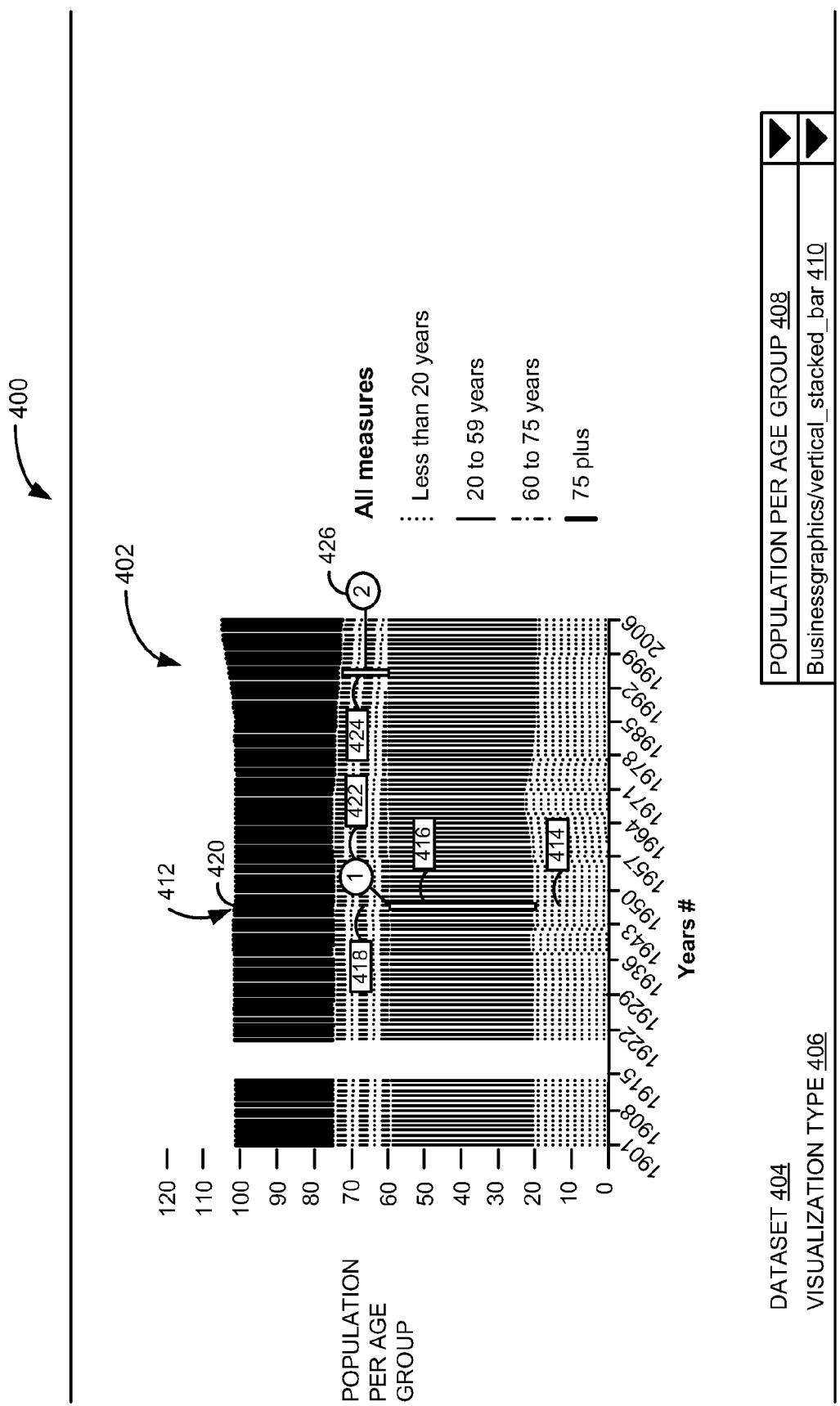
FIG. 4 is an exemplary block diagram illustrating visualization of a "population per age group" dataset, according to an embodiment.

FIG. 4 is an exemplary block diagram 400 illustrating a visualization 402 of a "population per age group" dataset, according to an embodiment. Initially a user selects a dataset 404 and a visualization type 406 for visualizing the selected dataset. As shown, the user selects a "population per age group" dataset 408 and a "vertical stacked bar" visualization type 410 for visualizing the "population per age group" dataset 408. Based on the data stored in the "population per age group" dataset 408 and the visualization type "vertical stacked bar" 410 the system creates the visualization, "population per age group" vertical stacked bar 402, which is a visualization of the "population per age group' dataset 408. As shown, the created "population per age group" vertical stacked bar 402 is displayed on the computer screen.

Each vertical stacked bar of the "population per age group" vertical stacked bar 402 includes four regions. For example, the vertical stacked bar 412 includes a region 1 414, a region 2 416, a region 3 418, and a region 4 420. Each region of the "population per age group" vertical stacked bar 402 has context information. For example, the context information of the region 1 414 includes a dimension ID: year, a dimension quantity: 1946, a measure ID: "population for age group less than 20 years", and a measure value: 30 million. The context information of the regions of the "population per age group" vertical stacked bar 402 are compared with the context information stored in a plurality of annotations stored in the memory. Based on the comparison, it is determined that the context information (dimension ID: year, dimension quantity: 1947, a measure ID: "population for age group 20-50 years", and the measure value: 56 million) of region 2 416 matches with the context information stored in an annotation "1" 422 and the context information (dimension ID: year, dimension quantity: 1996, measure ID: "population for age group 60 years", and the measure value: 10 million) of region 5 424 matches with the context information stored in an annotation "2" 426. As shown, the annotation 1 422 and the annotation 2 426 are displayed on the matching regions: region 2 416 and region 5 424, respectively of the "population per age group" vertical stacked bar chart 402.

Figure 5:
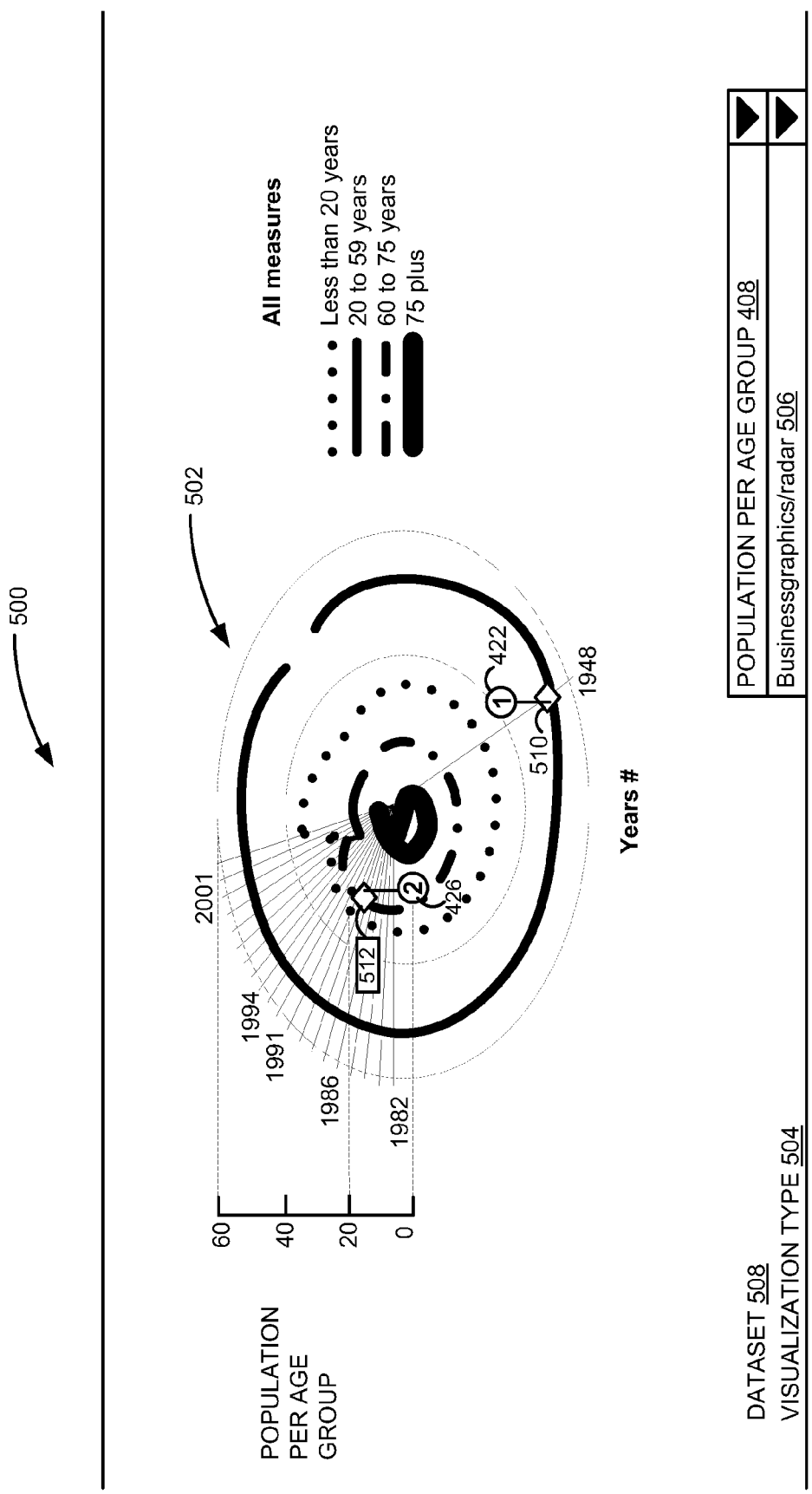
FIG. 5 is an exemplary block diagram illustrating visualization when either of the annotation 1 or the annotation 2 of FIG. 4 is selected, according to an embodiment.

FIG. 5 is an exemplary block diagram 500 illustrating a visualization 502 when either of the annotation 1 422 or the annotation 2 426 of FIG. 4 is selected, according to an embodiment. In one embodiment, the user clicks on either the annotation 1 422 or the annotation 2 426 of FIG. 4 for obtaining information related to these annotations. As discussed above, the annotations store the context information of the data points for which the annotation was created. Based on the received user selection, the system creates the visualization 502 based on the visualization type and the dataset stored in the annotation 1 422 or the annotation 2 426. The visualization type 504 stored in the annotation 1 422 or the annotation 2 426 is a "radar chart" 506. The dataset 508 stored in the annotation 1 422 or the annotation 2 426 is the "population per age group" dataset 408 (FIG. 4). The system creates the "population per age group" radar chart 502 based on the data in the "population per age group" dataset 408 and the visualization type "radar chart" 506. As shown, the created "population per age group" radar chart 502 is displayed on the computer screen. The annotation 1 422 or the annotation 2 426 also store the context information of the data point 1 510 or the data point 2 512, respectively, for which the annotation 1 422 or the annotation 2 426, respectively, were created. Based on the stored context information, the annotation 1 422 or the annotation 2 426 are displayed on the data point 1 510 or the data point 2 512, respectively of the "population per age group" radar chart 502.

Figure 6:
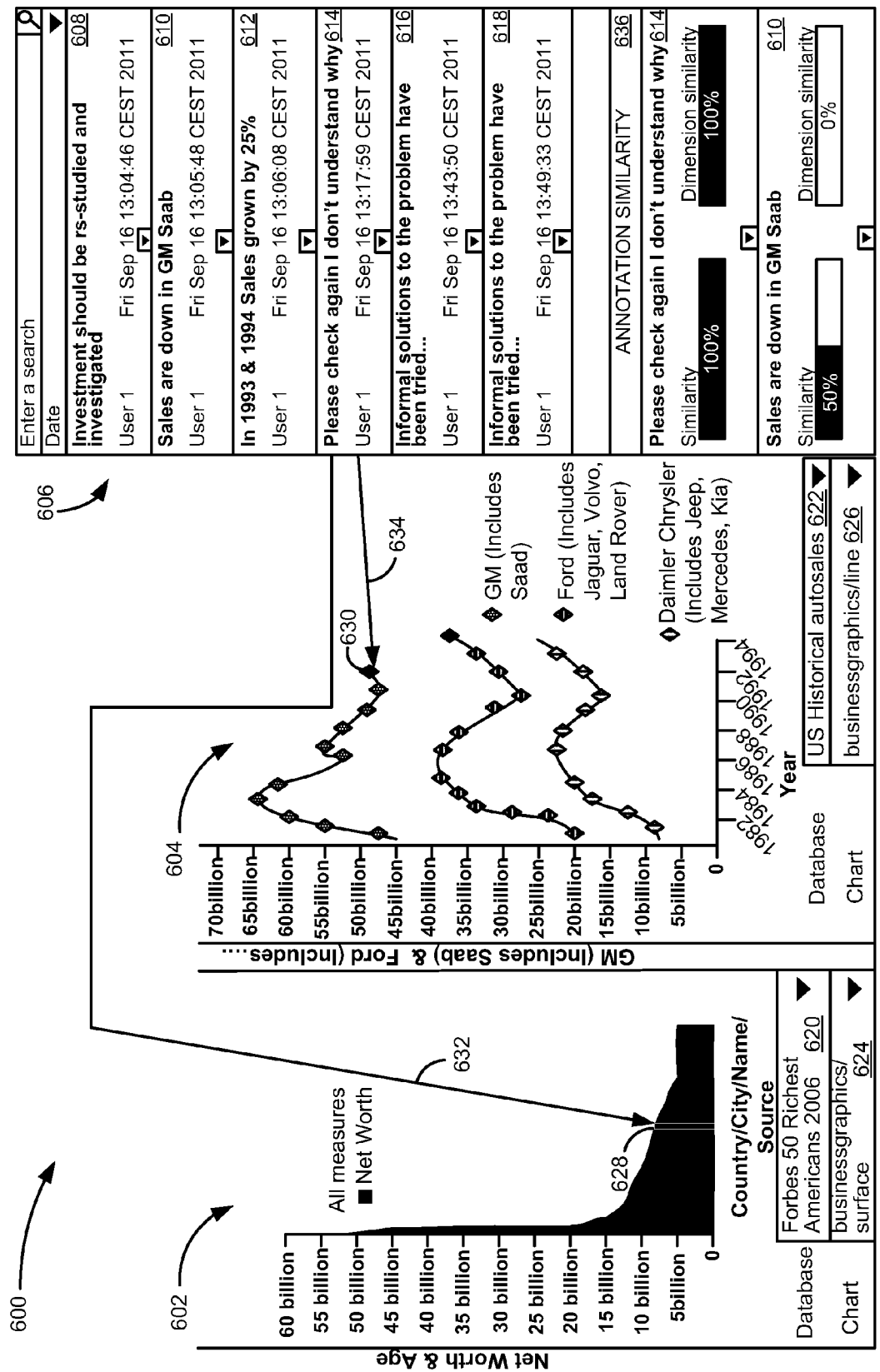
FIG. 6 is an exemplary block diagram illustrating visualizations related to a selected annotation, according to an embodiment.

FIG. 6 is an exemplary block diagram 600 illustrating visualizations 602 and 604 related to a selected annotation, according to an embodiment. Initially, a list of annotations 606 stored in the memory is displayed to a user. The list of annotations 606 includes six annotations 608, 610, 612, 614, 616, and 618. The list 606 displays the name of each of the annotations 608-618 ("investment should be re-installed and investigated", "sales are down in GM Saab", "In 1993 and 1994 Sales grow by 25%", "Please check this again, I don't understand why", "Internal solutions to the problem have been tried", and "Internal solutions to the problem have been tried d."), the creator of each of the annotations 608-618 ("User 1"), and the creation time of each of the annotations 608-618 ("Fri Sep 16 13:04:46 CEST 2011", "Fri Sep 16 13:05:48 CEST 2011", "Fri Sep 16 13:06:08 CEST 2011", "Fri Sep 16 13:17:59 CEST 2011", "Fri Sep 16 13:43:50 CEST 2011", and "Fri Sep 16 13:49:33 CEST 2011").

As shown, the user selects annotation "Please check this again, I don't know why" 614 to view information related to annotation 614. The selected annotation 614 stores a "Forbes 50 richest Americans 2006" dataset 620 and a "US historical auto sales" dataset 622. The selected annotation also stores a "surface graph" visualization type 624 and a "line graph" visualization type 626. Based on the datasets 620 and 622 and the visualization types 624 and 626 stored in the annotation 614, the system creates the "Forbes 50 richest Americans 2006" surface graph 602 and the "US historical auto sales" line graph 604, which are displayed on the computer screen. The annotation 614 also stores context information of a data point 1 628 and a data point 2 630 for which the annotation 614 was created. Based on the stored context information, arrows 632 and 634 indicating the data point 1 628 and the data point 2 630, respectively, on the "Forbes 50 richest Americans 2006" surface graph 602 and the "US historical auto sales" line graph 604, respectively, for which the annotation 614 was created, is displayed.

In one embodiment, a list of annotations 636 which are similar to the selected annotation 614 are also displayed along with their similarity measure value. As shown, the list 636 includes the annotation 614 with a similarity measure value of 100% and the annotation 610 with a similarity measure value 50%.

Figure 7A:
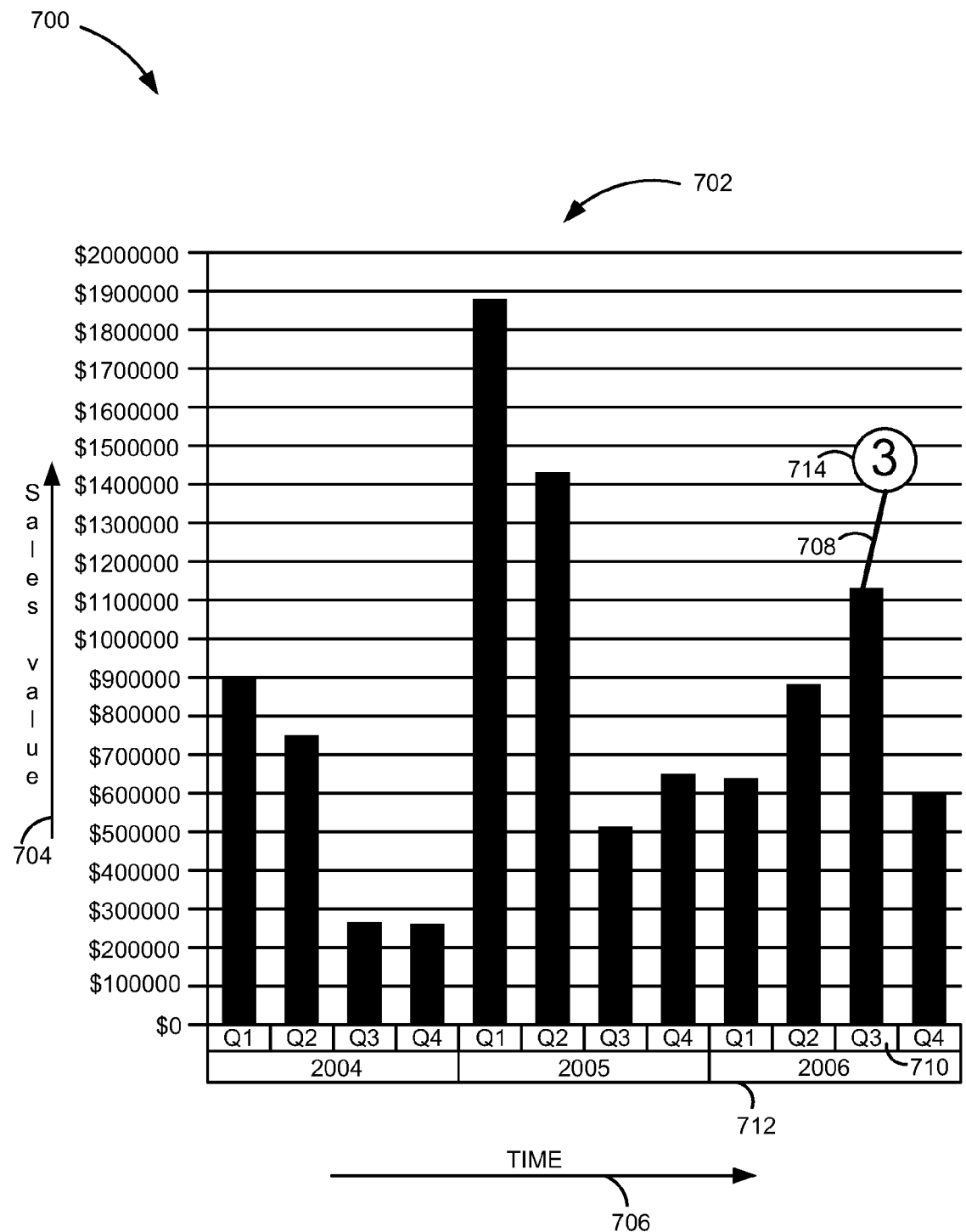
FIGS. 7A-7B is an exemplary block diagram illustrating an annotation at different hierarchical levels of a sales bar chart, according to an embodiment.
Figure 7B:
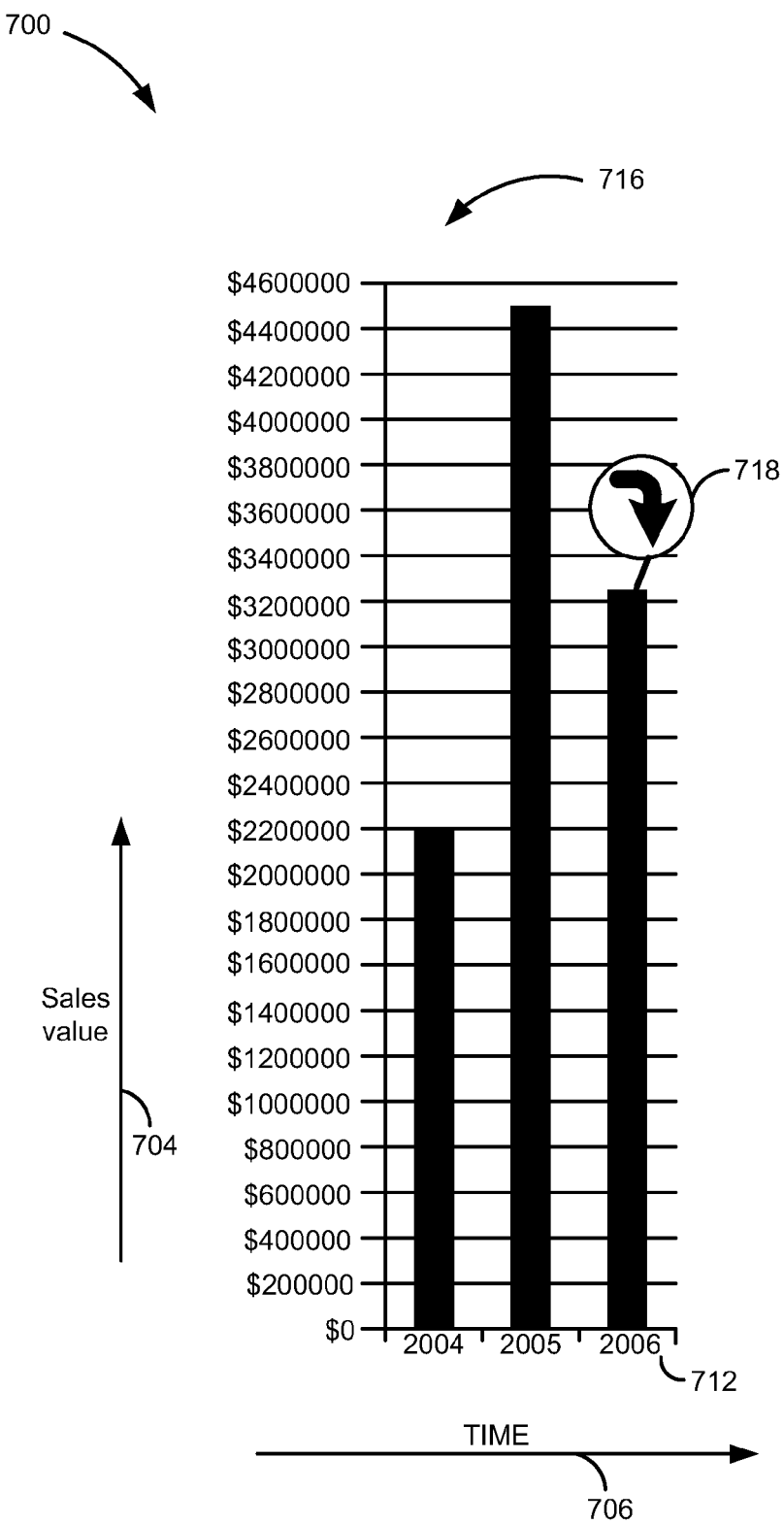

FIGS. 7A-7B is an exemplary block diagram 700 illustrating an annotation at different hierarchical levels of a sales bar chart 702, according to an embodiment. As shown in FIG. 7A, the sales bar chart 702 displays the sales value 704 ("measure ID" sales) of a product for a certain period of time 706 ("dimension ID" time). The dimension "time" 706 is a hierarchical dimension having two levels—a dimension "quarter" (Q1-Q4), and a dimension "year" (2004-2006), which is an upper level of the dimension "quarter". A user selects a data point 708 in the sales bar chart 702, which represents the sales value 704 of Q3 (dimension value for dimension "quarter") 710 of year 2006 (dimension value for dimension year, which is an upper level of the dimension quarter) 712, for creating an annotation "3" 714. During the creation of the annotation "3" 714, the system provides the user an option to choose the visibility information for the annotation "3" 714, which is the hierarchical level on which the user wants the annotation "3" 714 to be visible. In this case, the user is provided an option to choose whether the annotation "3" 714 is to be visible for both the dimension year "2006" 712 and dimension quarter "Q3" 710 or for only the dimension quarter "Q3" 710. The user selected visibility information is stored in the annotation "3" 714.

Next, consider that the user selects the annotation "3" 714 to be visible for both the dimension quarter "Q3" 710 level and the dimension year "2006". In this case, as shown in the sales bar graph 716 of FIG. 7B, if the user views the sales bar chart 702 on a granularity level of "year" then an icon 718 representing the annotation "3" 714 is displayed on the year "2006" 712. In case, the user clicks on the icon 718 then the sales bar chart 702 of FIG. 7A is displayed along with the annotation "3" 714 on the data point 708.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls or web services being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
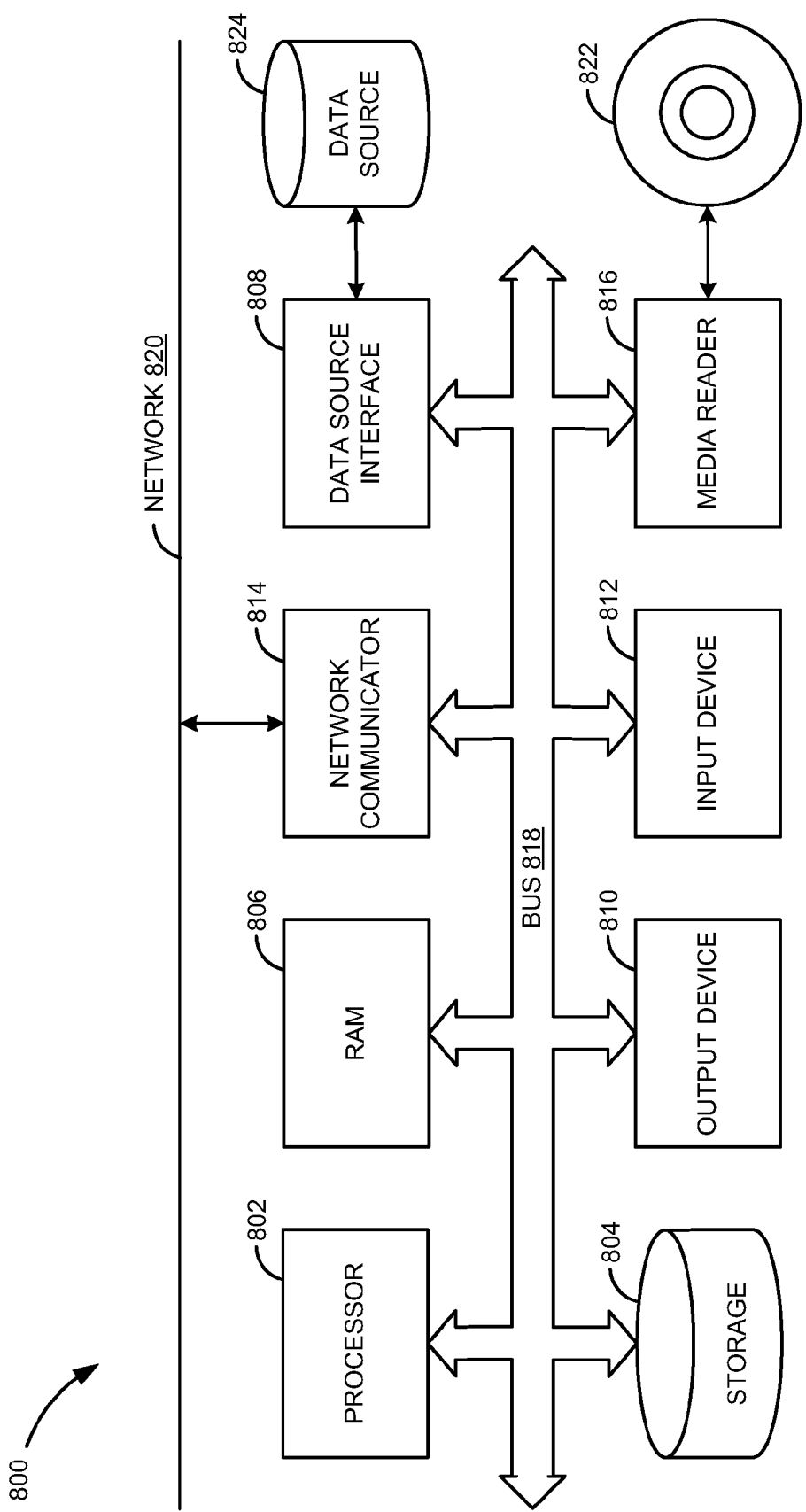
FIG. 8 is a block diagram illustrating a computing environment in which the techniques described for context aware annotations can be implemented, according to an embodiment.

FIG. 8 is a block diagram of an exemplary computer system 800. The computer system 800 includes a processor 802 that executes software instructions or code stored on a computer readable storage medium 822 to perform the above-illustrated methods of the invention. The computer system 800 includes a media reader 816 to read the instructions from the computer readable storage medium 822 and store the instructions in storage 804 or in random access memory (RAM) 806. The storage 804 provides a large space for keeping static data where at least some instructions could be stored for later execution. The stored instructions may be further compiled to generate other representations of the instructions and dynamically stored in the RAM 806. The processor 802 reads instructions from the RAM 806 and performs actions as instructed. According to one embodiment of the invention, the computer system 800 further includes an output device 810 (e.g., a display) to provide at least some of the results of the execution as output including, but not limited to, visual information to users and an input device 812 to provide a user or another device with means for entering data and/or otherwise interact with the computer system 800. Each of these output devices 810 and input devices 812 could be joined by one or more additional peripherals to further expand the capabilities of the computer system 800. A network communicator 814 may be provided to connect the computer system 800 to a network 820 and in turn to other devices connected to the network 820 including other clients, servers, data stores, and interfaces, for instance. The modules of the computer system 800 are interconnected via a bus 818. Computer system 800 includes a data source interface 808 to access data source 824. The data source 824 can be accessed via one or more abstraction layers implemented in hardware or software. For example, the data source 824 may be accessed by network 820. In some embodiments the data source 824 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to display an annotation in a plurality of visualization types, the method comprising:

receiving a user input to create the annotation with respect to a plurality of data points included within two or more visualizations displayed on a user interface of a computer, wherein the two or more visualizations are a visual representation of two or more data sets;

based on the received user input, a processor of the computer, creating the annotation, wherein creating the annotation includes:

storing, a visualization type of the two or more visualizations, context information of the plurality of data points, and the two or more data sets in the annotation;

receiving a user request to visualize a dataset according to a user selected visualization type from the plurality of visualization types;

based on the received user request, the processor of the computer, creating a visualization of the dataset according to the user selected visualization type;

displaying, on the user interface of the computer, the created visualization of the dataset, the displayed visualization including one or more regions, wherein the one or more regions of the displayed visualization are defined by a context information;

the processor of the computer, comparing the context information of the one or more regions with the context information of the plurality of data points stored in the annotation;
based on the result of comparison, the annotation is displayed on a region, from the plurality of regions, of the displayed visualization that has same context information as the context information stored in the annotation;
receiving a user selection of the displayed annotation;
based on the received user selection, the processor of the computer, creating the two or more visualizations based on the visualization type and the two or more datasets stored in the selected annotation; and
displaying, on the user interface of the computer, the created two or more visualizations, wherein an icon representing the annotation is displayed on the plurality of data points of the displayed two or more visualizations and other information stored in the annotation is also displayed on the user interface of the computer.

2. The computer implemented method according to claim 1, wherein comparing the context information further comprises:
based on the comparison, the processor of the computer, determining whether the context information of at least one of the one or more regions matches the context information of the annotation.

3. The computer implemented method according to claim 2, wherein displaying the annotation further comprises:
based on the determination, displaying, on the user interface of the computer, the annotation on the one of the one or more regions of the displayed visualization.

4. The computer implemented method according to claim 1 wherein creating the annotation includes:
storing the created annotation in the memory of the computer.

5. The computer implemented method according to claim 4, further comprising:
displaying, on the user interface of the computer, the stored annotation to the user.

6. The computer implemented method according to claim 4, wherein receiving the user input includes:
receiving a life time of the annotation from the user;
storing, in the memory of the computer, the received life time in the annotation; and
based on the stored life time, the processor of the computer, deleting the annotation from the memory of the computer.

7. The computer implemented method according to claim 4, wherein creating the annotation further comprises:
displaying, on the user interface of the computer, a hierarchical information with respect to the data point in the two or more visualizations;
based on the displayed hierarchical information, receiving a visibility information of the annotation from the user; and
storing the received visibility information in the annotation.

8. The computer implemented method according to claim 7, wherein displaying the annotation further comprises:
displaying the annotation based on the stored visibility information.

9. A non-transitory computer readable storage medium to tangibly store instructions, which when executed by a computer, causes the computer to:
receive a user input to create an annotation with respect to plurality of data points included within two or more visualizations displayed on a user interface of a computer, wherein the two or more visualizations are a visual representation of two or more data sets;
based on the received user input, a processor of the computer, creating the annotation, wherein creating the annotation includes:
storing, a visualization type of the two or more visualizations, context information of the plurality of data points, and the two or more data sets in the annotation;
receive a user request to visualize a dataset according to a user selected visualization type;
based on the received user request, create a visualization of the dataset according to the user selected visualization type;
display the created visualization of the dataset, the displayed visualization including one or more regions, wherein the one or more regions of the displayed visualization are defined by a context information;
compare the context information of the one or more regions with the context information of the plurality of data points stored in an annotation;
based on the comparison, the annotation is displayed on a region, from the plurality of regions, of the displayed visualization that has same context information as the context information stored in the annotation;
receive a user selection of the displayed annotation;
based on the received user selection, create the two or more visualizations based on the visualization type and the two or more datasets stored in the selected annotation; and
display the created two or more visualizations, wherein an icon representing the annotation is displayed on the plurality of data points of the displayed two or more visualizations and other information stored in the annotation is also displayed on the user interface of the computer.

10. The non-transitory computer readable storage medium according to claim 9, further comprising instructions which when executed by the computer further causes the computer to:
determine whether the context information of at least one of the one or more regions matches with the context information of the annotation.

11. The non-transitory computer readable storage medium according to claim 10, further comprising instructions which when executed by the computer further causes the computer to:
display the annotation on the one of the one or more regions of the displayed visualization.

12. The non-transitory computer readable storage medium according to claim 9, further comprising instructions which when executed by the computer further causes the computer to:
store the created annotation in the memory of the computer.

13. The non-transitory computer readable storage medium according to claim 12, further comprising instructions which when executed by the computer further causes the computer to:
display the stored annotation to a user.

14. A computer system to display an annotation in different visualization types, the computer system comprising:
a memory to store a program code; and
a processor communicatively coupled to the memory, the processor configured to execute the program code to:
receive a user input to create the annotation with respect to plurality of data points included within two or more visualizations displayed on a user interface of a computer, wherein the two or more visualizations are a visual representation of two or more data sets;

based on the received user input, a processor of the computer, creating the annotation, wherein creating the annotation includes:
  storing, a visualization type of the two or more visualizations, context information of the plurality of data points, and the two or more data sets in the annotation;
receive a user request to visualize a dataset according to a user selected visualization type;
based on the received user request, create a visualization of the dataset according to the user selected visualization type;
display the created visualization of the dataset, the displayed visualization including one or more regions, wherein the one or more regions of the displayed visualization are defined by a context information;
compare the context information of the one or more regions with the context information of the plurality of data points stored in the annotation;
based on the comparison, the annotation is displayed on a region, from the plurality of regions, of the displayed visualization that has same context information as the context information stored in the annotation;
receive a user selection of the displayed annotation;
based on the received user selection, create the two or more visualizations based on the visualization type and the two or more datasets stored in the selected annotation; and
display the created two or more visualizations, wherein an icon representing the annotation is displayed on the plurality of data points of the displayed two or more visualizations and other information stored in the annotation is also displayed on the user interface of the computer.

15. The system of claim 14, wherein the processor further executes the program code to:
  determine whether the context information of at least one of the one or more regions matches with the context information of the annotation.

16. The system of claim 15, wherein the processor further executes the program code to:
  display the annotation on the one of the one or more regions of the displayed visualization.

17. The system of claim 14, wherein the processor further executes the program code to:
  store the created annotation in the memory of the computer.

18. The system of claim 17, wherein the processor further executes the program code to:
  receive a user selection of the displayed annotation;
  based on the received user selection, create the two or more visualizations based on the visualization type and the two or more datasets stored in the annotation; and
  display the created two or more visualizations.

* * * * *